(12) United States Patent
Nakatsuka et al.

(10) Patent No.: US 10,795,772 B2
(45) Date of Patent: Oct. 6, 2020

(54) MEMORY SYSTEM

(71) Applicant: TOSHIBA MEMORY CORPORATION, Tokyo (JP)

(72) Inventors: Hiroyasu Nakatsuka, Machida Tokyo (JP); Mikiya Kurosu, Narashino Chiba (JP); Yasuo Kudo, Higashiyamato Tokyo (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 70 days.

(21) Appl. No.: 15/991,111

(22) Filed: May 29, 2018

(65) Prior Publication Data

US 2019/0087275 A1    Mar. 21, 2019

(30) Foreign Application Priority Data

Sep. 15, 2017  (JP) .................................. 2017-178224

(51) Int. Cl.

| G06F 3/00 | (2006.01) |
| G06F 11/14 | (2006.01) |
| G06F 11/20 | (2006.01) |
| G06F 1/3287 | (2019.01) |
| G06F 1/3212 | (2019.01) |
| G06F 3/06 | (2006.01) |

(52) U.S. Cl.
CPC ........ *G06F 11/1441* (2013.01); *G06F 1/3212* (2013.01); *G06F 1/3287* (2013.01); *G06F 3/0619* (2013.01); *G06F 3/0625* (2013.01); *G06F 3/0634* (2013.01); *G06F 3/0659* (2013.01); *G06F 3/0679* (2013.01); *G06F 11/2015* (2013.01)

(58) Field of Classification Search
None
See application file for complete search history.

(56) References Cited

U.S. PATENT DOCUMENTS

| 9,195,293 B1 | 11/2015 | Quillen et al. |
| 10,431,305 B2 * | 10/2019 | Farmahini Farahani ..................... G11C 7/1084 |
| 2013/0262773 A1 * | 10/2013 | Sugizaki ............... G06F 12/121 711/133 |
| 2015/0263518 A1 | 9/2015 | Liu |
| 2017/0060208 A1 | 3/2017 | Sawai et al. |

FOREIGN PATENT DOCUMENTS

JP    2017-49965 A    3/2017

* cited by examiner

*Primary Examiner* — Midys Rojas
(74) *Attorney, Agent, or Firm* — Kim & Stewart LLP

(57) ABSTRACT

A memory system includes a volatile memory, a nonvolatile memory, and a controller. The controller is configured to execute a non-volatilization process to store data in the volatile memory into the nonvolatile memory in response to an initiate request received by the controller if no cancellation request is received by the controller during a cancelable period that begins upon receipt of the initiate request by the controller, and to transmit a completion notification when the non-volatilization process has completed.

20 Claims, 15 Drawing Sheets

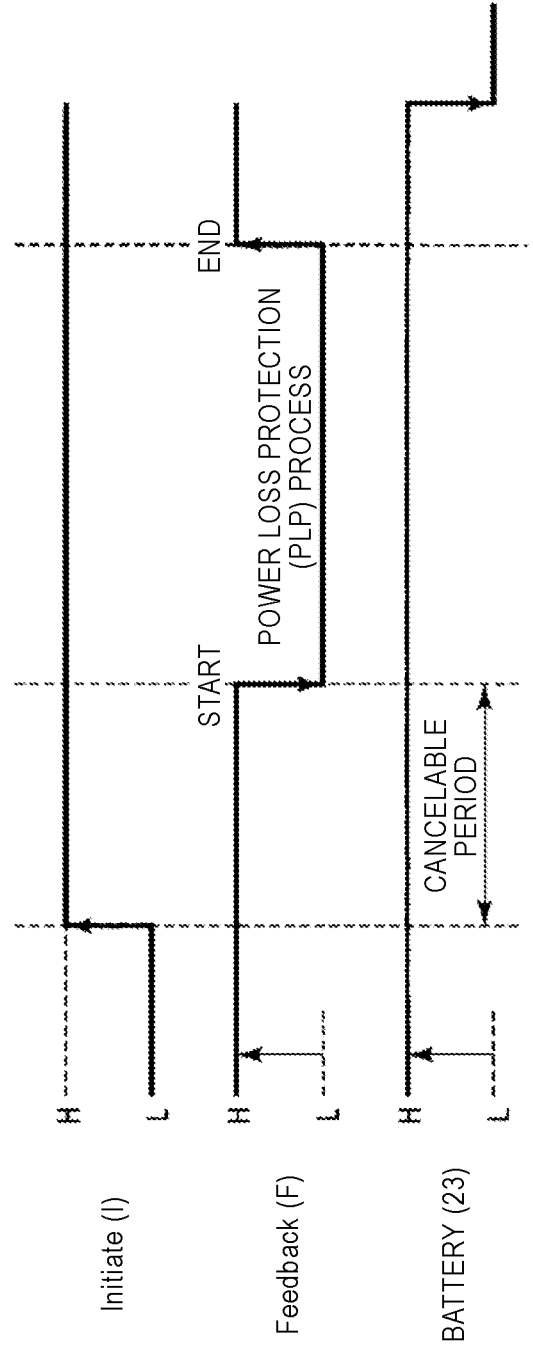

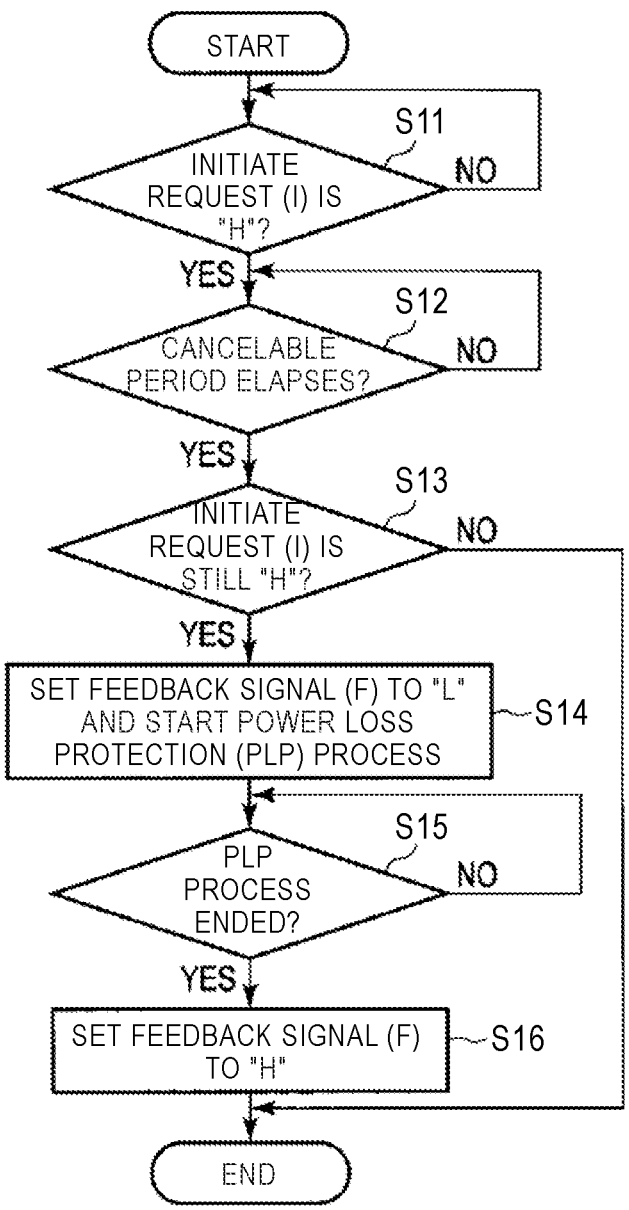

FIG. 4

| SUPPORT OR NO SUPPORT FOR PLP PROCESS |
|---|
| MAXIMUM VALUE AND MINIMUM VALUE OF CANCELABLEPERIOD |
| TYPICAL VALUE AND WORST VALUE REQUIRED FOR PLP PROCESS |

FIG. 5

| SETTING OF ON/OFF OF PLP PROCESS AND SETTING OF PLP PROCESS MODE |
|---|
| SETTING OF ASSIGNMENT OF PIN THAT RECEIVES INITIATE REQUEST (I) |
| SETTING OF POLARITY OF INITIATE REQUEST (I) |
| SETTING OF ASSIGNMENT OF PIN OF FEEDBACK SIGNAL (F) |
| SETTING OF ATTRIBUTE OF PIN OF FEEDBACK SIGNAL (F) |
| SETTING OF CANCELABLE PERIOD |

FIG. 6

| THE NUMBER OF TIMES OF COMPLETION OF PLP PROCESS AND THE NUMBER OF TIMES OF INCOMPLETION OF PLP PROCESS |
|---|

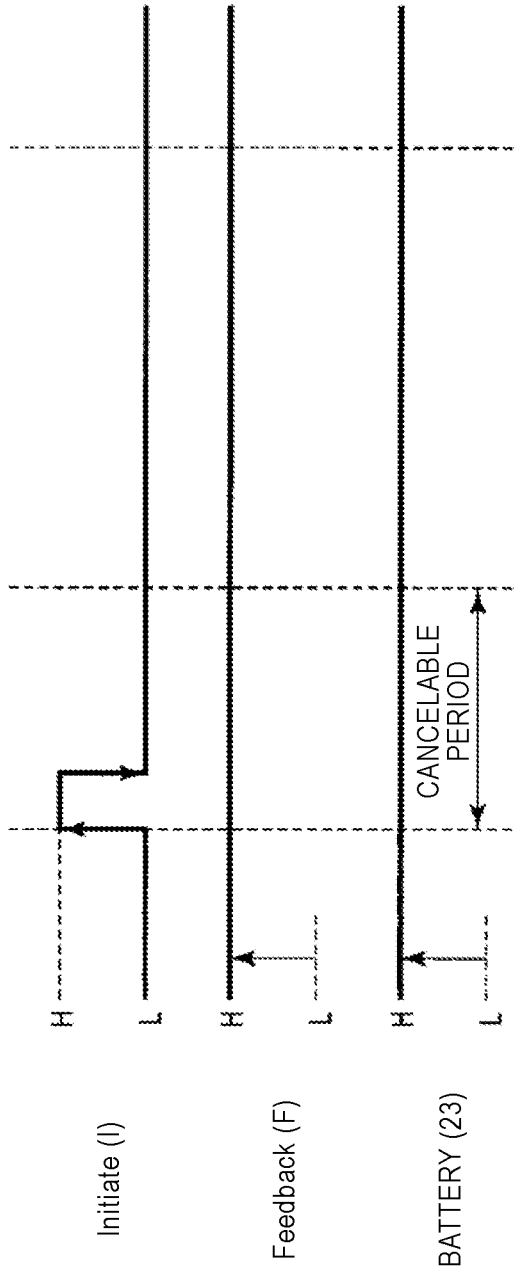

MEMORY SYSTEM

CROSS-REFERENCE TO RELATED APPLICATION

This application is based upon and claims the benefit of priority from Japanese Patent Application No. 2017-178224, filed Sep. 15, 2017, the entire contents of which are incorporated herein by reference.

FIELD

Embodiments described herein relate generally to a memory system including a nonvolatile memory, which is employed in, for example, an information processing apparatus.

BACKGROUND

A solid state drive (SSD) with a NAND type flash memory is known as a memory system. The SSD is used as a main storage for various computing devices.

In the SSD, for example, if power supplied to the SSD is lost during recording of data into the flash memory, there is a risk of losing the data being recorded. To avoid this risk, it is necessary to include a backup capacitor in the SSD and to record and non-volatilize the data being recorded in the flash memory by using power stored in the backup capacitor when the power supplied to the SSD is lost.

In the following description, protection of data that is volatile at the time of power loss is referred to as power loss protection (PLP).

DESCRIPTION OF THE DRAWINGS

FIG. 2 is a timing chart illustrating the operation of a memory system according to a first embodiment.

FIG. 3 is a flowchart illustrating the operation of the memory system according to the first embodiment.

FIG. 4 illustrates an example of attributes and capabilities supported by the memory system applied to the embodiments.

FIG. 5 illustrates an example of functions set in the memory system applied to the embodiments.

FIG. 6 illustrates an example of logs recorded in the memory system applied to the embodiments.

FIG. 7 is a timing chart illustrating the operation of a memory system according to a second embodiment.

DETAILED DESCRIPTION

Figure 1:
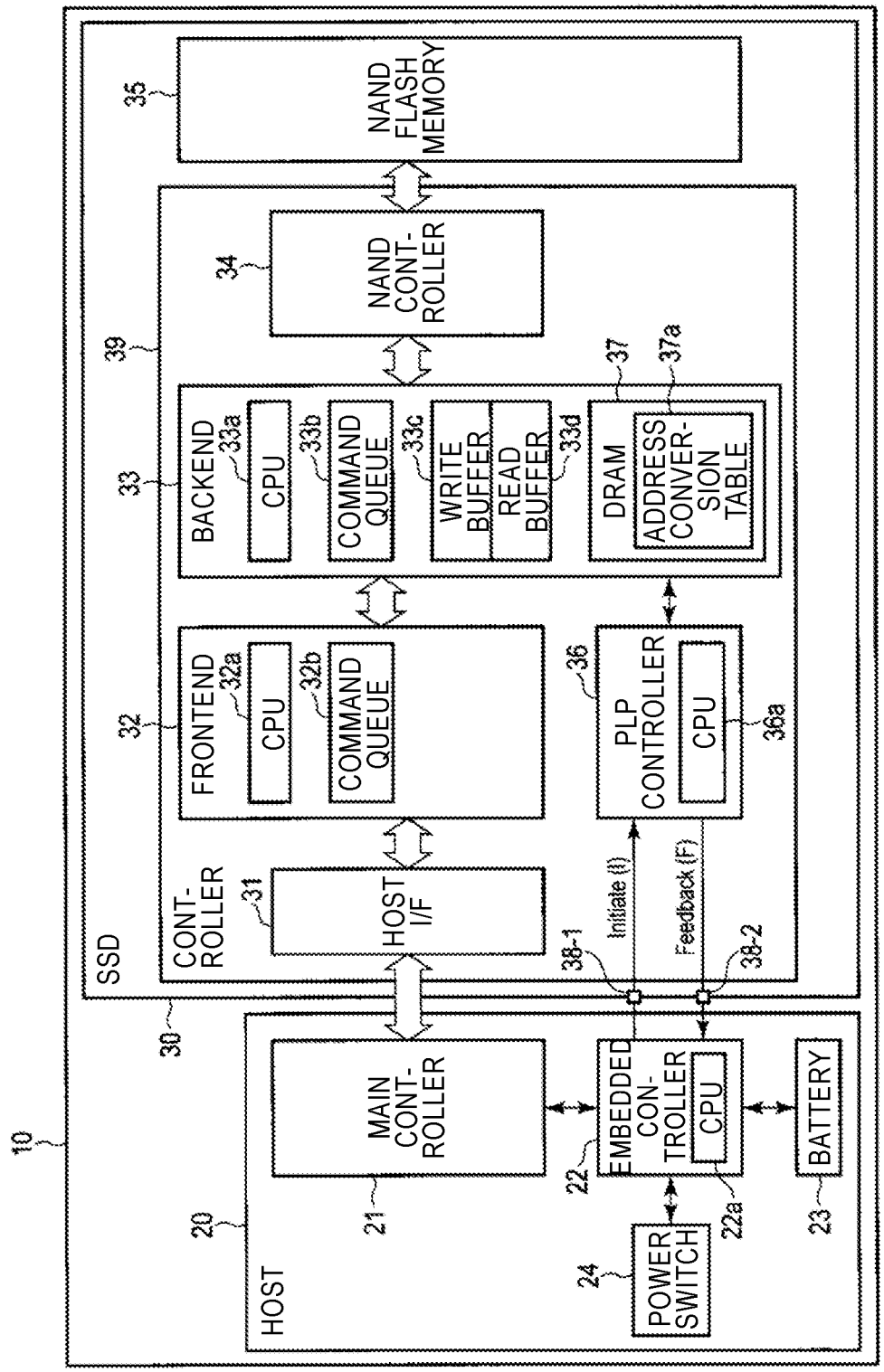
FIG. 1 is a view illustrating an example of the configuration of an information processing apparatus including a memory system according to embodiments.

It is generally difficult for an inexpensive system to use a backup capacitor to protect against power loss.

Embodiments provide a memory system equipped with a function of low-cost and high-reliable power loss protection.

In general, according to one embodiment, a memory system includes a volatile memory, a nonvolatile memory, and a controller. The controller is configured to execute a non-volatilization process to store data in the volatile memory into the nonvolatile memory in response to an initiate request received by the controller if no cancellation request is received by the controller during a cancelable period that begins upon receipt of the initiate request by the controller, and to transmit a completion notification when the non-volatilization process has completed.

Hereinafter, embodiments will be described with reference to the drawings. In the drawings, the same parts are denoted by the same reference numerals.

Configuration

FIG. 1 illustrates an example of an information processing apparatus 10 including a memory system according to embodiments. The information processing apparatus 10 is, for example, a notebook computer or a tablet computer driven by a battery and may include a display (not illustrated) and a keyboard (not illustrated).

A memory system is a semiconductor storage device configured to write data into a nonvolatile memory and read data from the nonvolatile memory. The memory system is implemented by, for example, a solid state drive (SSD) 30 with a NAND flash memory 35.

The information processing apparatus 10 includes a host 20 and the SSD 30. The SSD 30 is used as, for example, a main storage of the information processing apparatus 10 and is accessed by the host 20.

The host 20 controls the overall operation of the information processing apparatus 10 and includes, for example, a main controller 21, an embedded controller 22, a battery 23, and a power switch 24. The host 20 may further include a communication device (not illustrated) such as Wi-Fi.

The main controller 21 processes information according to, for example, an operating system or an application program. In order to access the SSD 30 in response to a read request or a write request, the main controller 21 issues a host interface (I/F) command such as a write command or a read command including a logical block address (LBA) as a logical address.

When issuing the write command, the main controller 21 supplies data to be recorded based on the write command to the SSD 30. When issuing the read command, the main controller 21 receives data supplied from the SSD 30.

After issuing the write command or the read command, the main controller 21 receives, for example, a notification of completion of the write processing or the read processing from the SSD 30.

The embedded controller 22 includes, for example, a CPU 22a by which the operation of the embedded controller 22 is controlled.

The embedded controller 22 controls the power supply of the information processing apparatus 10. That is, the embedded controller 22 detects the remaining capacity of the battery 23, detects the operation of the power switch 24, and controls the supply of power to each part of the host 20 and the SSD 30.

In addition, upon detecting a power loss, the embedded controller 22 supplies an initiate request (I) for initiating a power loss protection (PLP) process as described below to the SSD 30. Further, after issuing the initiate request (I) to the SSD 30, the embedded controller 22 receives a feedback signal (F) supplied from the SSD 30 and stops the supply of power from the battery 23 to the SSD 30 when the feedback signal (F) indicates the end of the PLP process.

The term "power loss" used herein means that power is not supplied to the SSD 30 from an external power supply (not illustrated) or the battery 23 serving as a power supply.

The cause of the power loss includes a normal shutdown and an abnormal shutdown of the power supply of the information processing apparatus 10. The abnormal shutdown includes a shutdown due to an unexpected power switch operation by a user.

Regardless of the normal shutdown or the abnormal shutdown of the power supply of the information processing apparatus 10, upon detecting the power loss based on the operation of the power switch 24 or the power reduction of the battery 23, the embedded controller 22 issues the initiate request (I) for initiating the PLP process for the SSD 30 before stopping the supply of power to the SSD 30.

The battery 23 is, for example, a lithium ion battery and is charged by an external power supply (not illustrated). The battery 23 supplies power to each part of the host 20 and the SSD 30.

The configuration of the host 20 is not limited to the configuration described herein and may be modified.

The SSD 30 is supplied with power from the host 20 and operates in response to a request from the host 20.

The SSD 30 receives from the main controller 21 a read command or a write command for user data specified by a logical address. For the write command, the SSD 30 stores the data received from the main controller 21 in the NAND flash memory 35 through a write buffer 33c. For the read command, the SSD 30 transmits the data stored in the NAND flash memory 35 to the main controller 21 through a read buffer 33d.

The SSD 30 includes, for example, a host interface (host I/F) 31, a frontend 32, a backend 33, a NAND controller 34, the NAND flash memory 35, and a PLP controller 36.

The host I/F 31, the frontend 32, the backend 33, the NAND controller 34, and the PLP controller 36 may be provided in, for example, the controller 39. The controller 39 is configured as, for example, a system on a chip (SoC).

The host I/F 31 is an interface for connecting the SSD 30 to the host 20. For example, the host I/F 31 may be a standard interface such as SCSI, serial attached SCSI (SAS), ATA, serial ATA (SATA), PCI Express (PCIe)®, Ethernet®, Fibre channel, or NVM Express (NVMe)®.

The frontend 32 receives and processes a host I/F command from the main controller 21 via the host I/F 31 and exchanges data with the main controller 21. The frontend 32 includes, for example, a CPU 32a and a command queue 32b and mainly processes the host I/F command. The function of the frontend 32 may be realized by software (firmware) executed on the CPU 32a. The function of the frontend 32 may also be realized by hardware.

The command queue 32b, which has a queue structure capable of storing multiple commands, receives the host I/F command from the main controller 21. If the command type is a read request or a write request for user data, the command queue 32b transfers the command to the backend 33. The CPU 32a of the frontend 32 cooperates with a CPU 33a of the backend 33 to transfer data between the write buffer 33c and the main controller 21 and between the read buffer 33d and the main controller 21.

The backend 33 includes, for example, the CPU 33a, a command queue 33b, a dynamic random access memory (DRAM) 37 as a volatile memory, and the write buffer 33c and the read buffer 33d configured with a volatile memory.

The function of the backend 33 may be realized by firmware executed on the CPU 33a. The function of the backend 33 may also be realized by hardware. The backend 33 functions as a control unit for converting the host I/F command into a command adaptable for the NAND flash memory 35 to execute various processes.

The backend 33 performs, for example, the following processes.

Responding to various commands, such as a write command and a read command, supplied from the main controller 21.

Data reading/writing during garbage collection which organizes storage areas in the NAND flash memory 35.

Converting a logical address supplied from the main controller 21 into a physical address of the NAND flash memory 35.

Updating management information such as an address conversion table 37a in the DRAM 37.

Non-volatilization processing of data into the NAND flash memory 35 when the supply of power to the SSD 30 is lost. Such data includes data updated in the DRAM 37 but not updated in the NAND flash memory 35 (e.g., an address conversion table), and data stored in the write buffer 33c of which a completion notification has been transmitted to the host 20 and which is not saved in the NAND flash memory 35.

The backend 33 further includes the following functions related to the embodiment.

The contents of the PLP process are substantially the same as those of the non-volatilization process and further include processes to be described later.

The DRAM 37 stores, for example, the address conversion table 37a. The address conversion table 37a is a table indicating the association of LBA as a logical address supplied from the main controller 21 with location (block address+page address in block) of data recorded on the NAND flash memory 35.

The DRAM 37 is managed by the CPU 33a. The address conversion table 37a is stored in the NAND flash memory 35 when the supply of power to the SSD 30 is stopped. When the SSD 30 is powered-on, the address conversion table 37a is read from the NAND flash memory 35 into the DRAM 37. The address conversion table 37a on the DRAM 37 is saved and stored in the NAND flash memory 35 periodically or at the time of the stop of the supply of power.

The command queue 33b has a queue structure capable of storing multiple commands. The CPU 33a uses the address conversion table 37a in the DRAM 37 to convert the LBA of the command received from the frontend 32 into a physical address on the NAND flash memory 35. The read command or the write command in the command queue 33b, including this physical address, is sequentially supplied to the NAND controller 34.

The NAND controller 34 controls the writing, reading, and erasing of the NAND flash memory 35 based on the command issued from the backend 33.

The NAND flash memory 35 includes a memory array in which multiple memory cells are arranged in a matrix. Each memory cell is capable of storing multi-level data to form upper and lower pages. Data writing and reading is executed on a page basis. The NAND flash memory 35 includes several blocks, each of which includes several pages. A block is a unit of data erasure. One page is composed of multiple sectors of data. A sector is the minimum unit of data access by the host.

The NAND flash memory 35 may have a two-dimensional structure or a three-dimensional structure.

The PLP controller 36 includes, for example, a CPU 36a that controls the operation of the PLP controller.

The PLP controller 36 receives the initiate signal (I) issued from the embedded controller 22 and instructs the backend 33 to initiate the power loss protection (PLP) process. When a power loss is detected, the initiate request (I) is issued from the embedded controller 22.

The PLP controller 36 uses the feedback signal (F) to notify the embedded controller 22 of the start and end of the PLP process.

Power is supplied from the battery 23 of the host 20 to the SSD 30 until the PLP process is completed. This eliminates the need to provide a backup capacitor in the SSD 30, thereby achieving reduction in costs.

The initiate request (I) and the feedback signal (F) are communicated through pins 38-1 and 38-2 provided in the SSD 30. The pins 38-1 and 38-2 may be pins not specified in the interface standard among multiple pins provided in the SSD 30. The pins used for the initiate request (I) and the feedback signal (F) are assigned by the host 20, as will be described.

The configuration of the SSD 30 is not limited to that illustrated in FIG. 1. For example, the PLP controller 36 may be provided in the backend 33 and the NAND controller 34 may also be provided in the backend 33. The DRAM 37 may be separated from the backend 33. In addition, the volatile memory is not limited to the DRAM 37, but it may be a memory such as a static random access memory (SRAM). Further, the nonvolatile memory is not limited to the NAND flash memory 35, but it may be a memory such as a resistive memory or a magnetic random access memory (MRAM).

First Embodiment

The operation of the first embodiment will be described with reference to FIGS. 2 and 3.

FIG. 2 is a timing chart illustrating the operation of the PLP controller 36 according to a first embodiment. In FIG. 2, the initiate request (I) is, for example, high-active and the feedback signal (F) is, for example, low-active. The polarity of the initiate request (I) and the attribute of a pin through which the feedback signal (F) is output are set by the host 20 and may be changed, as will be described later.

FIG. 3 illustrates an example of the operation of the CPU 36a provided in the PLP controller 36.

When the embedded controller 22 detects a power loss, it issues an initiate request (I) for initiating the PLP process to the SSD 30, as illustrated in FIG. 2. That is, the embedded controller 22 changes the initiate request (I) from a low level "L" to a high level "H."

As illustrated in FIG. 3, upon detecting that the initiate request (I) has been issued (YES in S11), the PLP controller 36 of the SSD 30 determines whether or not a cancelable period, e.g., 1 ms, has elapsed (S12). This cancelable period is set by the host 20 within a range defined by maximum value and minimum value and may be changed, as will be described later.

When it is determined by the PLP controller 36 that the cancelable period has elapsed (YES in S12), the PLP controller 36 determines whether or not the initiate request (I) is still issued (S13).

When it is determined that the initiate request (I) is still issued (YES in S13), the PLP controller 36 lowers the feedback signal (F) from the high level "H" to the low level "L," sends it to the embedded controller 22, and instructs the backend 33 to perform the PLP process (S14).

The backend 33 performs the PLP process based on the instruction from the PLP controller 36.

When the PLP process is completed (YES in S15), the PLP controller 36 raises the feedback signal (F) from the low level "L" to the high level "H" and transmits it to the embedded controller 22 (S16).

When the feedback signal (F) is at the high level, the embedded controller 22 turns off the battery 23 and stops the supply of power to the SSD 30, as illustrated in FIG. 2.

Implementation Example

An implementation example for enabling the above-described PLP process will be described below. This implementation example is in compliance with the NVMe standard, but it may be achieved using other interfaces.

FIG. 4 illustrates the attributes and capabilities supported by the SSD 30 recorded as a list.

Support or no support for PLP process
The maximum and minimum values capable of being set for the cancelable period
Typical value and worst value (e.g., maximum value) of time required for the PLP process The time required for the PLP process may be different for different SSDs. Thus, a normal value suitable for most cases is set as the typical value and the worst value is set for the assumed worst case.

The host 20 may use, for example, an Identify command to identify the functions provided by the SSD 30.

FIG. 5 illustrates various functions that can be set in the SSD 30.

The host 20 may use, for example, a SetFeature command to configure the SSD 30 with the following functions illustrated in FIG. 5.

Setting of ON/OFF of the PLP process and setting of a PLP process mode
Setting of assignment of pin that receives the initiate request (I)
Setting of polarity of the initiate request (I)
Setting of assignment of pin of the feedback signal (F)
Setting of attribute of pin that outputs the feedback signal (F)
Setting of the cancelable period That is, the host 20 determines whether to use the PLP process by turning the PLP process on or off based on the indication of whether or not PLP process is supported acquired from the SSD 30 using the Identify command.

When the PLP process is used, the PLP processing mode may be selected. That is, a first mode in which the PLP processing time is long and a second mode in which the PLP processing time is short may be selected. In the first mode, for example, data to be non-volatilized is non-volatilized after rearranged so that the data can be easily read at the time of reading. In this case, after the power is supplied to the SSD 30 again, the data may be read at a high speed. In the second mode, since priority is given to shortening the time required for the non-volatilization process, the data to be non-volatilized is not rearranged. In this case, after the power is supplied to the SSD 30 again, it may take more time to read the data than in the first mode. The host 20 may select these modes with the SetFeature command.

The host 20 can assign a pin to be used for the initiate request (I) and the feedback signal (F) in the SSD 30.

The host 20 can set the polarity of the initiate request (I) to high-active or low-active.

The host 20 may set the attribute of a pin that outputs the feedback signal (F) to open-drain or push-pull.

The host 20 may use the Identify command to set an appropriate cancelable period within the range defined by maximum and minimum values acquired from the SSD 30.

In addition, as illustrated in FIG. 6, the SSD 30 may record the number of times of completion of the PLP process and the number of times of incompletion of the PLP process, as a log in the NAND flash memory 35.

The host 20 may use, for example, a GetLog command to acquire the log recorded in NAND flash memory 35. If the number of times of incompletion of the PLP process is large, since the supply of power is stopped before the PLP process is ended, it may be assumed that the PLP process has failed and that the PLP is not functioning effectively.

In this case, by adjusting the issuance time of the initiate request (I), it may be possible to reduce the number of times of failure of the PLP process, to ensure a more stable operation of the information processing apparatus 10. Specifically, the host 20 may use the Identify command to acquire the worst value of the PLP processing time illustrated in FIG. 4 from the SSD 30. The host 20 then may control the issuance time of the initiate request (I) so that the time from the issuance of the initiate request (I) to the stoppage of the supply of power to the SSD 30, exceeds the worst value.

Effects of First Embodiment

According to the first embodiment, upon detecting the power loss, the embedded controller 22 issues the initiate request (I) of the PLP process before the supply of power to the SSD 30 is interrupted. When the initiate request (I) continues to be issued after the cancelable period has elapsed, the SSD 30 that receives the initiate request (I) starts the PLP process. Therefore, data that has not been non-volatilized in the SSD 30 may be written in the NAND flash memory 35. As a result, the reliability of the SSD 30 and the information processing apparatus 10 to which the SSD 30 is applied may be improved.

Moreover, when the power loss is detected by the embedded controller 22, the SSD 30 receives power from the host 20 until the PLP process is ended. Therefore, the SSD 30 does not need to have a backup capacitor, requiring no additional cost for protection against power loss. Accordingly, it is possible to provide an SSD 30 with lower cost and higher reliability.

In addition, the initiate request (I) and the feedback signal (F) may be assigned to a pin of the SSD 30 from the host using the SetFeature command. Therefore, the pin assignment may be changed in compliance with the system to which the SSD 30 is applied. Accordingly, it is possible to configure the system easily.

Further, the polarity of the initiate request (I) may be changed using the SetFeature command from the host 20. Accordingly, it is possible to change the polarity of the initiate request (I) easily in compliance with the system to which the SSD 30 is applied.

In addition, the issuance time of the initiate request (I) may be adjusted with checking the worst value of the PLP processing time. Therefore, it is possible to ensure completion of the PLP process by the time the supply of power to the SSD 30 is stopped.

Further, it is possible to adjust the issuance time of the initiate request (I) based on the number of times of incompletion of the PLP process recorded in the log of the NAND flash memory 35. Therefore, it is possible to reduce the number of times of the PLP process having failed to complete and stably maintain the system to which the SSD 30 is applied.

Second Embodiment

FIG. 7 illustrates the operation of a second embodiment. In the first embodiment, the aspect that no cancellation is performed after issuing the initiate request (I) is described.

The second embodiment illustrates an aspect where the initiate request (I) is canceled within the cancelable period after the embedded controller 22 issues the initiate request (I). The host 20 may acquire the maximum value and the minimum value of the cancelable period as illustrated in FIG. 4 by issuing the Identify command. The embedded controller 22 may set a cancelable period within the range defined by the maximum value and the minimum value of the acquired cancelable period and may cancel the issued initiate request (I).

The operation of the second embodiment will be described below with reference to FIGS. 7 and 3.

As illustrated in FIG. 7, upon detecting a power loss, the embedded controller 22 issues the initiate request (I) and supplies it to the PLP controller 36. However, for example, if the power switch 24 is operated for less than a specified time, it is unlikely that power will not be supplied to the SSD 30 from an external power supply or the battery 23 as a power supply. Accordingly, the embedded controller 22 determines that the supply of power to the SSD 30 will not be stopped after the embedded controller 22 has once determined that there is a possibility that no power will be supplied to the SSD 30 for a time period, and thus cancels the initiate request (I) by lowering it from the high level to the low level. The cancellation of the initiate request (I) is performed within the cancelable period.

As illustrated in FIG. 3, when the initiate request (I) has been issued (YES in S11) and the cancelable period has elapsed (YES in S12), the PLP controller 36 of the SSD 30 determines whether or not the initiate request (I) is still at a high level (S13). When the initiate request (I) is at the low level (NO in S13 in FIG. 3), it is determined that the initiate request (I) has been canceled. Therefore, the PLP controller 36 does not initiate the PLP process and the feedback signal (F) is held at the high level. Accordingly, since the embedded controller 22 provides the supply of power to the information processing apparatus 10, the information processing apparatus 10 continues its operation.

Effects of Second Embodiment

According to the second embodiment, the embedded controller 22 determines that the supply of power to the SSD 30 will not be stopped after the embedded controller 22 has once determined that there is a possibility that no power will be supplied to the SSD 30. The issued initiate request (I) then may be canceled within the cancelable period. Therefore, it is possible to avoid a unnecessary PLP process and continue the operation condition of the information processing apparatus 10.

Third Embodiment

Figure 8:
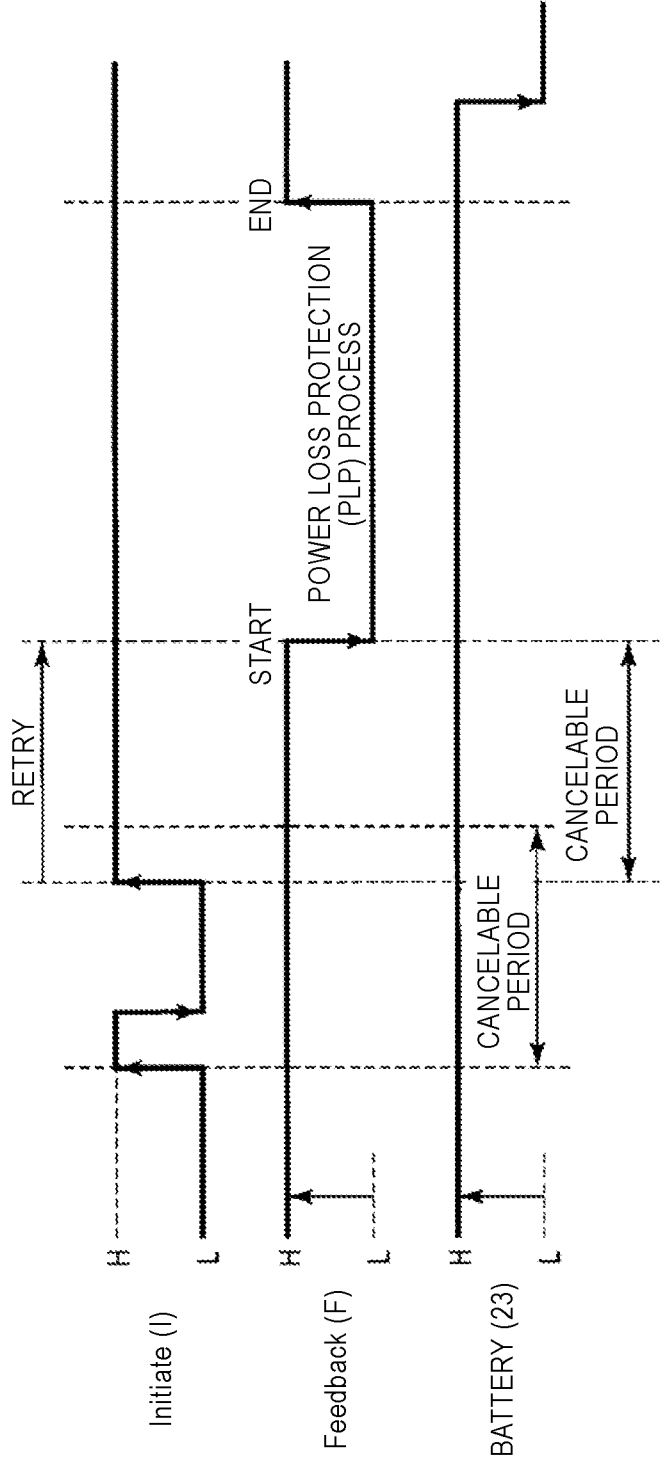
FIG. 8 is a timing chart illustrating the operation of a memory system according to a third embodiment.
Figure 9:
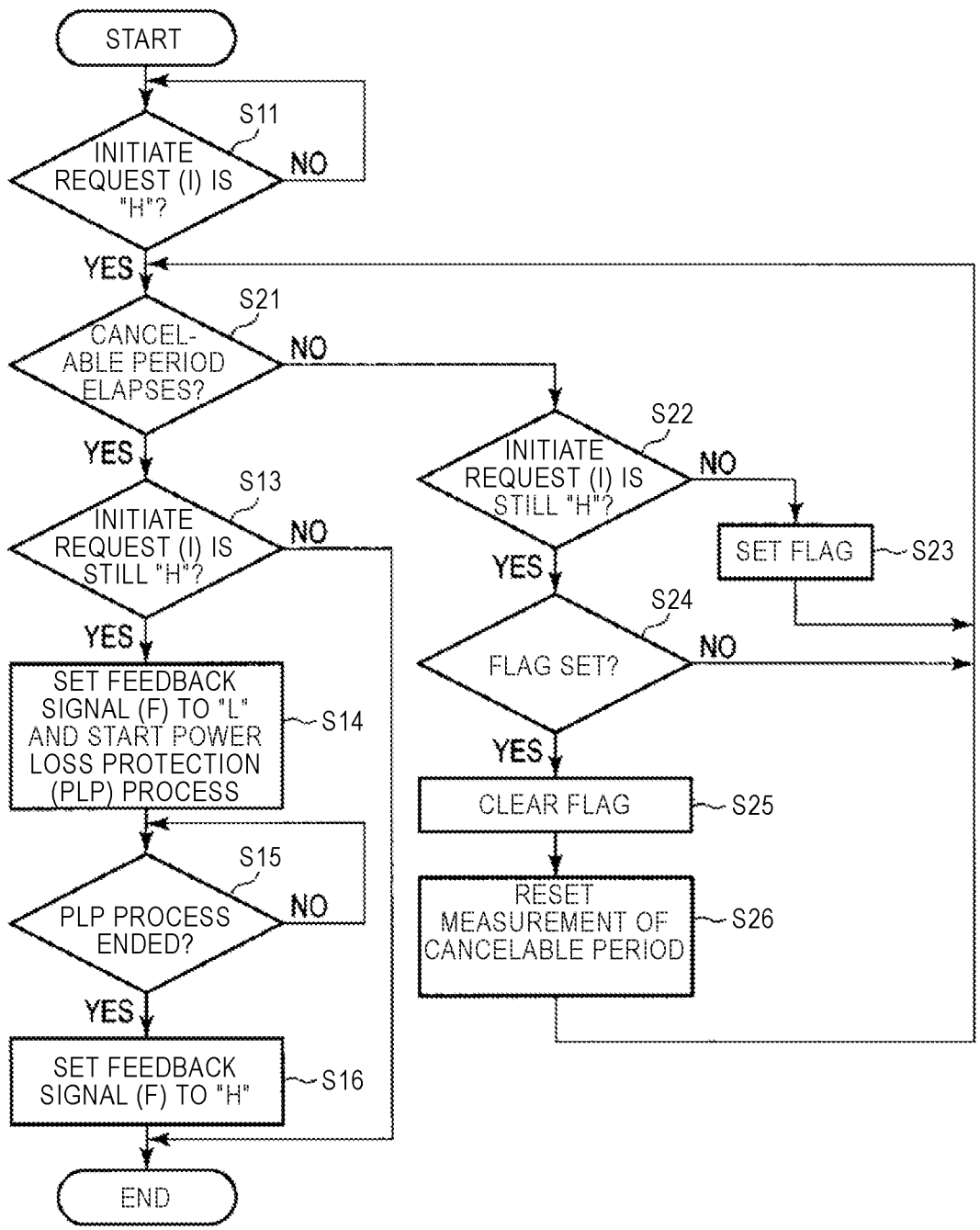
FIG. 9 is a flowchart illustrating the operation of the memory system according to the third embodiment.

FIGS. 8 and 9 illustrate the operation of a third embodiment.

In the second embodiment, after the initiate request (I) is issued, the initiate request (I) may be canceled within the cancelable period.

In the third embodiment, the cancelled initiate request (I) is issued again within the cancelable period.

The operation of the third embodiment will be described below with reference to FIGS. 8 and 9.

The embedded controller 22 determines that the supply of power to the SSD 30 will not be stopped after the embedded controller 22 has once determined that there is a possibility that no power is supplied to the SSD 30, and then the initiate request (I) is canceled. However, if the cause of the power loss occurs again, the embedded controller 22 re-issues the cancelled initiate request (I) within the cancelable period, as illustrated in FIG. 8.

As illustrated in FIG. 9, after the initiate request (I) is issued (YES in S11), the PLP controller 36 determines whether or not the cancelable period has elapsed (S21). When it is determined that the cancelable period has not been elapsed (No in S21), it is determined whether or not the initiate request (I) is still issued (S22). When it is determined that the initiate request (I) is no longer issued (i.e., has been canceled) (NO in S22), for example, a flag indicating that the initiate request (I) has been canceled is set (S23) and it is determined again whether or not the cancelable period has elapsed (S21).

When it is determined in S22 that the initiate request (I) is still issued (YES in S22), it is determined whether or not the flag is set (S24). When it is determined in S24 that the flag is set (YES in S24), the flag is cleared (S25) and the measurement of the cancelable period is reset (S26). Then, it is determined again whether or not the cancelable period has elapsed (S21).

Meanwhile, when it is determined that the flag is not set (NO in S24), it is determined again whether or not the cancelable period has elapsed (S21). When it is determined that the cancelable period has elapsed (YES in S21), it is determined that the initiate request (I) is still issued (S13). When it is determined that the initiate request (I) is still issued (YES in S13), the feedback signal (F) is set to the low level and the PLP process is initiated (S14). The subsequent operations and the operation in the case of NO in S13 are the same as those in the second embodiment.

Effects of Third Embodiment

According to the third embodiment, when the initiate request (I) is issued again within the cancelable period after issuing the initiate request (I), the PLP process is initiated and the cancelable period is reset. Therefore, it is possible to execute the PLP process reliably even when the initiate request (I) is re-issued after being cancelled by the embedded controller 22. Accordingly, it is possible to improve the reliability of the information processing apparatus 10.

Fourth Embodiment

Figure 10:
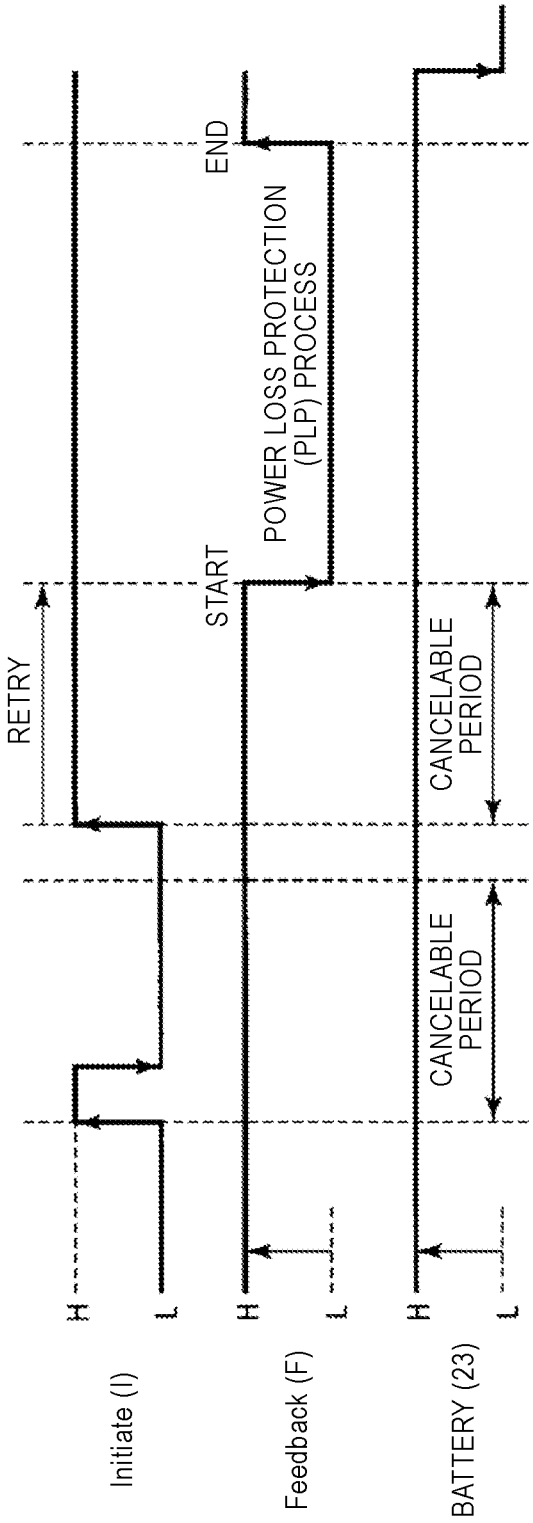
FIG. 10 is a timing chart illustrating the operation of a memory system according to a fourth embodiment.
Figure 11:
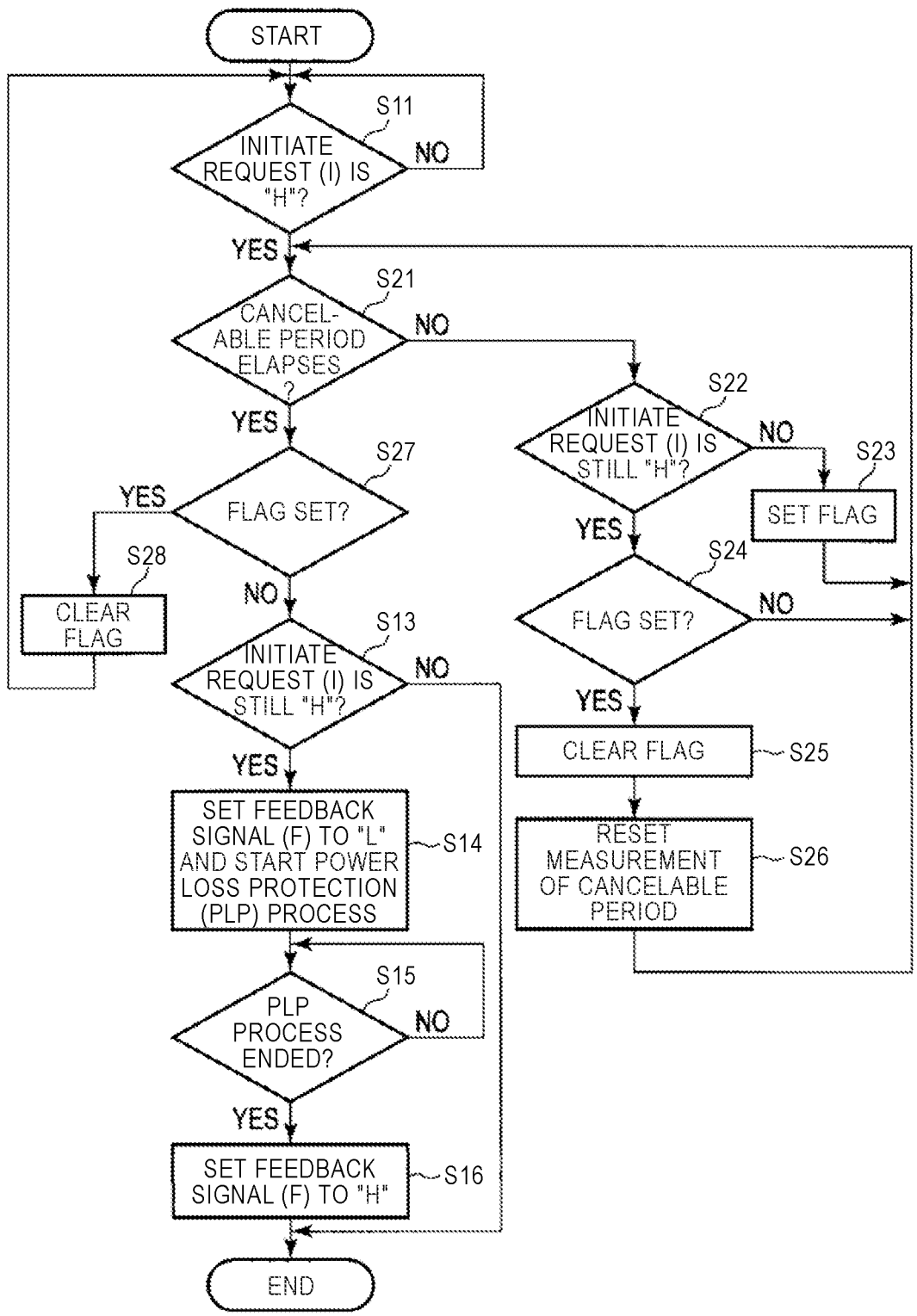
FIG. 11 is a flowchart illustrating the operation of the memory system according to the fourth embodiment.

FIGS. 10 and 11 illustrate the operation of a fourth embodiment.

In the third embodiment, the issued initiate request (I) is canceled within the cancelable period and then, the initiate request (I) is re-issued within the cancelable period.

In the fourth embodiment, in a case where the issued initiate request (I) is canceled within the cancelable period, the initiate request (I) may be re-issued when the power loss is detected again after the cancelable period elapses.

As illustrated in FIG. 10, when the initiate request (I) is issued by the embedded controller 22 and is canceled before the cancelable period elapses, the embedded controller 22 re-issues the initiate request (I) after the cancelable period elapses.

The operation where the initiate request (I) that was canceled during the cancelable period is re-issued after the cancelable period elapses will be described below with reference to FIG. 11.

As illustrated in FIG. 11, when the initiate request (I) is issued from the embedded controller 22 (YES in S11), the PLP controller 36 of the SSD 30 determines whether or not the cancelable period has elapsed (S21). When the initiate request (I) is canceled within the cancelable period (NO in S21) (NO in S22), a flag indicating that the initiate request (I) has been canceled is set (S23).

When it is determined in S21 that the cancelable period has elapsed (YES in S21), it is determined whether or not the flag has been set (S27). When it is determined that the flag has been set (YES in S27), the flag is cleared (S28) and the control proceeds to S11 where it is determined again whether or not the initiate request (I) has been issued. When it is determined that the initiate request (I) has been issued (YES in S11), it is determined again whether or not the cancelable period has elapsed (S21). The subsequent operations are the same as in the second embodiment and the third embodiment.

Effects of Fourth Embodiment

According to the fourth embodiment, the initiate request (I) is issued to the SSD 30 if the power loss is predicted. When it is determined that the prediction is not correct and thus the initiate request (I) is cancelled within the cancelable period, the initiate request (I) is re-issued if the cause of the prediction occurs again after the cancelable period has elapsed. In this manner, the PLP process may be performed even when the initiate request (I) is re-issued. Therefore, it is possible to reliably initiate the PLP process and improve the reliability of the information processing apparatus 10.

Fifth Embodiment

Figure 12:
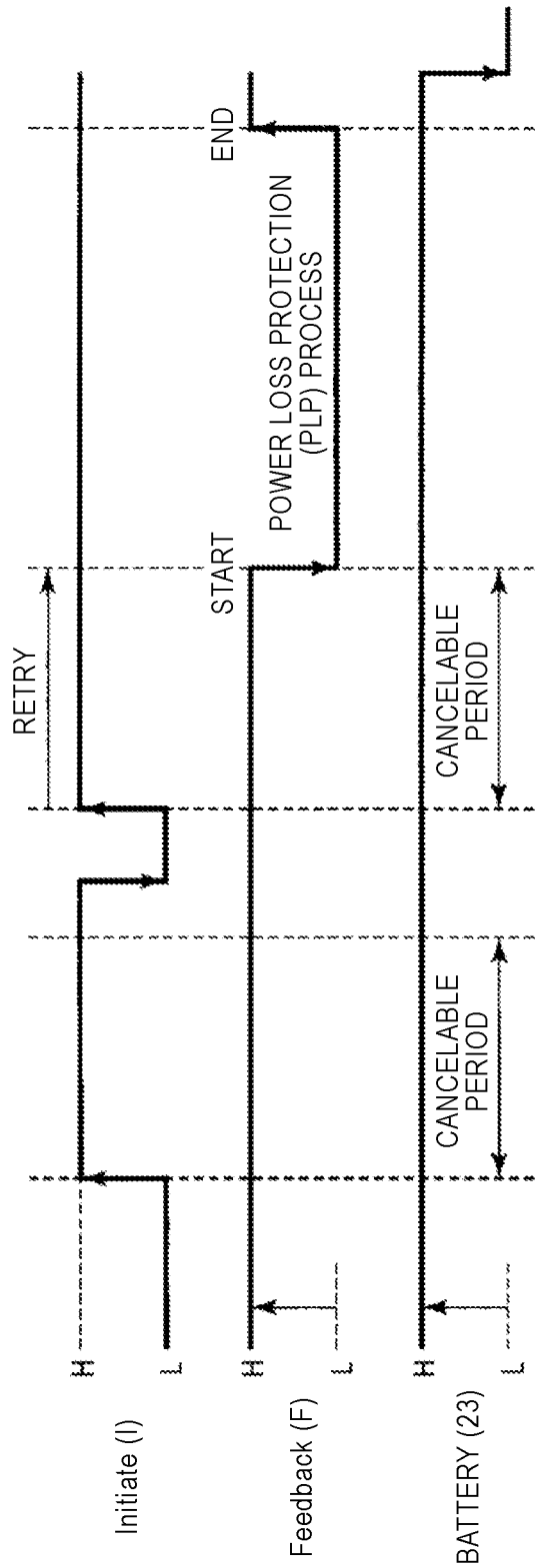
FIG. 12 is a timing chart illustrating the operation of a memory system according to a fifth embodiment.
Figure 13:
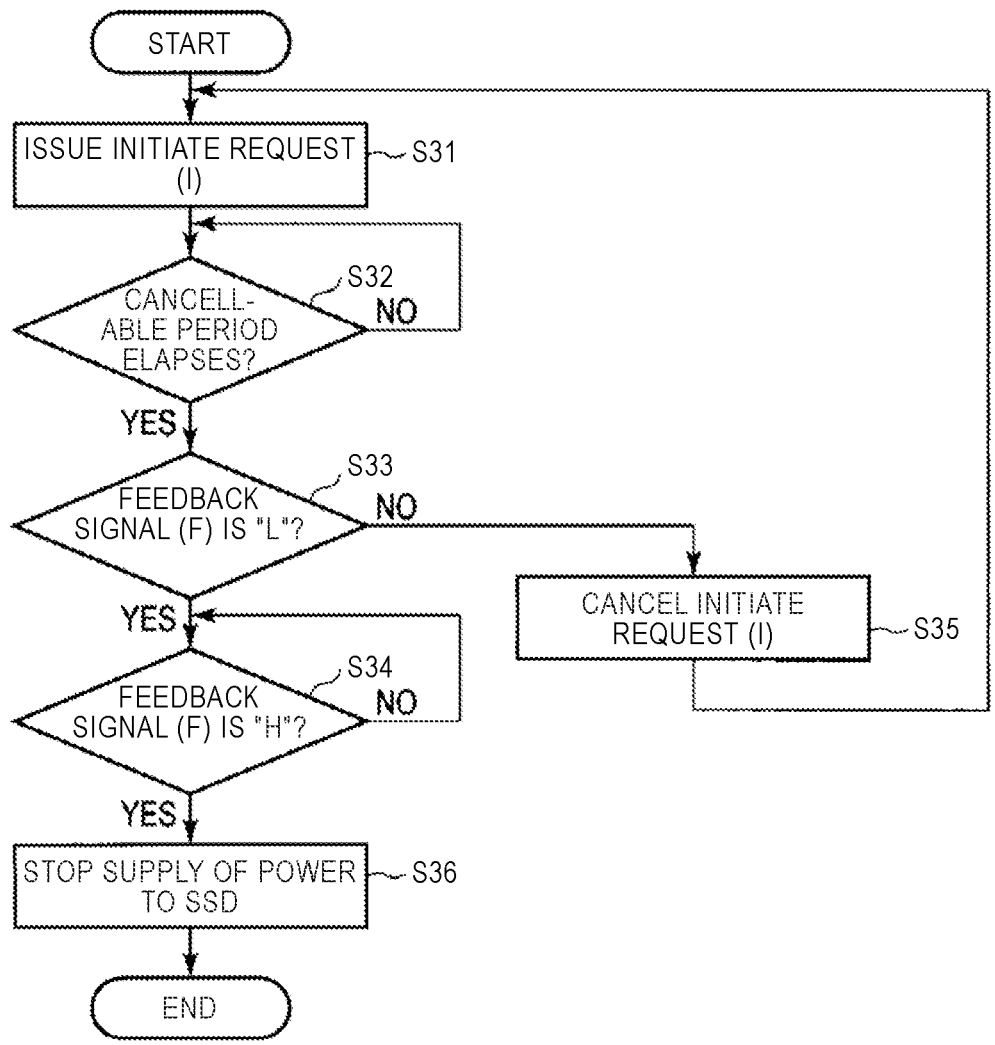
FIG. 13 is a flowchart illustrating the operation of an embedded controller according to the fifth embodiment.

FIGS. 12 and 13 illustrate the operation of a fifth embodiment.

In the third and fourth embodiments, the initiate request (I) is re-issued due to the power loss.

In a fifth embodiment, the initiate request (I) is re-issued when the PLP process cannot be started in the SSD 30 after the initiate request (I) is issued from the host 20.

As illustrated in FIG. 12, when the initiate request signal (I) is issued from the embedded controller 22 and the feedback signal (F) remains at the high level even after the cancelable period elapses, the embedded controller 22 recognizes that the PLP process has not been initiated in the SSD 30. In this case, the embedded controller 22 cancels the issued initiate request (I) and re-issues the initiate request (I).

As illustrated in FIG. 13, upon issuing the initiate request (I) (S31), the embedded controller 22 determines whether or not the cancelable period has elapsed (S32). When it is determined that the cancelable period has elapsed (YES in S32), it is determined whether or not the feedback signal is at the low level (S33). When it is determined that the feedback signal is not at the low level (NO in S33), the initiate request (I) is canceled (S35) and the initiate request (I) is re-issued (S31).

Meanwhile, when it is determined in S33 that the feedback signal is at the low level (YES in S33), it is determined whether or not the feedback signal is at the high level (NO in S34). When it is determined that the feedback signal is at the high level (YES in S34), the supply of power to the SSD 30 is stopped (S36).

When the PLP controller 36 of the SSD 30 receives the first issued initiate request (I) but is unable to execute the PLP process, or when it cannot receive the first issued initiate request (I), it executes the PLP process according to the re-issued initiate request (I), for example, according to the operation as illustrated in FIG. 9.

Effects of Fifth Embodiment

According to the fifth embodiment, when the PLP process cannot be initiated for the issued initiate request (I) in the SSD 30, the embedded controller 22 re-issues the initiate request (I). Therefore, it is possible to ensure the execution of the PLP process at the time of power loss and improve the reliability of the information processing apparatus 10.

Sixth Embodiment

In each of the above embodiments, when the initiate request (I) is canceled, the initiate request (I) is switched from the high level to the low level. However, without being limited thereto, after the initiate request (I) is set to the high level, a cancel request (C) indicating the cancellation of the initiate request (I) may be supplied from the host 20 to the SSD 30. The SSD 30 may be implemented so that the PLP process is not executed upon receiving the cancellation request (C).

Figure 14:
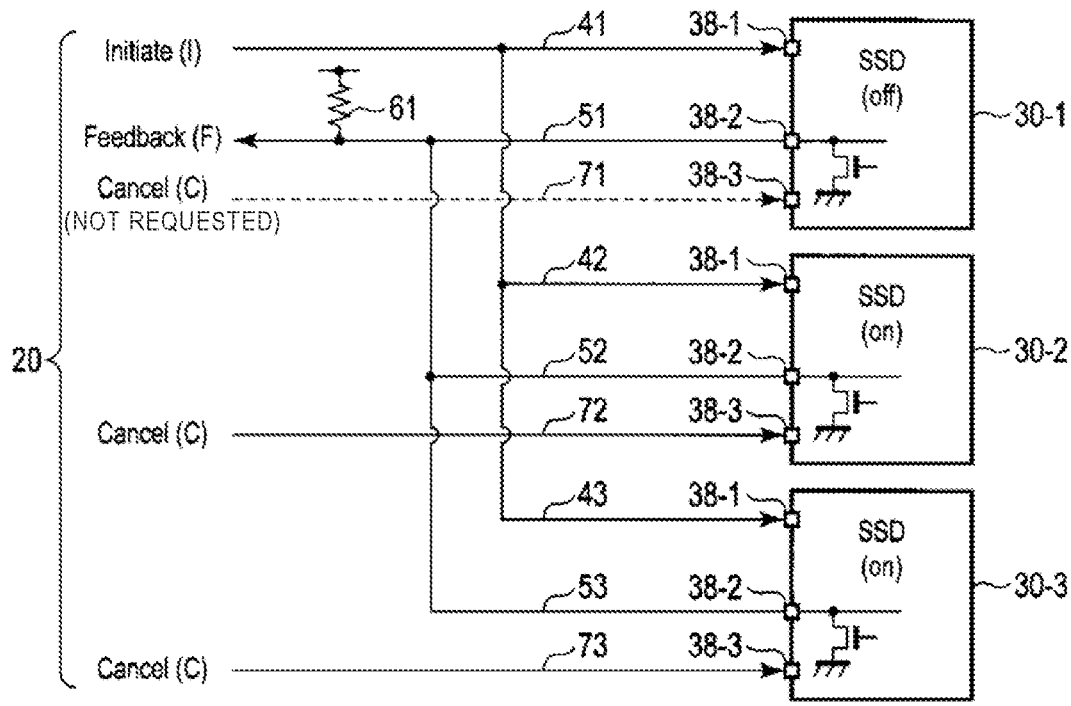
FIG. 14 is a view illustrating the configuration of a memory system according to a sixth embodiment.

FIG. 14 illustrates the configuration of the sixth embodiment.

In the sixth embodiment, the information processing apparatus 10 includes, for example, three SSDs 30-1, 30-2 and 30-3. The number of SSDs is not limited to three and may be fewer or more. All of the SSDs are not necessary and a combination of SSD and HDD (Hard Disk Drive) may be included in the information processing apparatus 10.

As illustrated in FIG. 14, the initiate request (I) issued from the embedded controller 22 is supplied to, for example, a wiring 41. Wirings 42 and 43 are connected to the wiring 41 and the initiate request (I) is transmitted to the SSDs 30-1, 30-2 and 30-3 via the wirings 41, 42 and 43, respectively.

The feedback signals (F) output from the SSDs 30-1, 30-2 and 30-3 via wirings 51, 52 and 53 are collected at, for example, the wiring 51 and are transmitted to the embedded controller 22. That is, the wirings 51, 52 and 53 constitute, for example, a wired OR circuit and the feedback signal (F) on the wiring 51 is transmitted to the embedded controller 22 as an output signal of the wired OR circuit.

The attribute of a pin 38-2 to which the wirings 51, 52 and 53 of the SSDs 30-1, 30-2 and 30-3 are connected is set to, for example, as an open-drain.

The wiring 51 is held at the high level by a pull-up resistor 61. When at least one of the wirings 51, 52 and 53 has the low level, the wiring 51 transmits a low-level feedback signal (F) to the embedded controller 22.

The open-drain or push-pull as the attribute of the pin may be set using, for example, the SetFeature command from the host 20.

In addition, for example, the host 20 and the SSDs 30-1, 30-2 and 30-3 are connected by wirings 71, 72 and 73. The wirings 71, 72 and 73 are connected to, for example, unused pins 38-3 of the SSDs 30-1, 30-2 and 30-3.

The cancellation request (C) for canceling the initiate request (I) is transmitted to the SSDs 30-1, 30-2 and 30-3 via the dedicated wiring 71, 72 and 73. The cancellation request (C) is issued using, for example, a PCIe command or a SMBus (System Management Bus) command.

The cancellation request (C) may be issued from the embedded controller 22 or may be issued from the main controller 21.

FIG. 14 assumes a case where the supply of power to the SSDs 30-1, 30-2 and 30-3 may be selectively controlled, the supply of power to the SSD 30-1 is to be stopped, and the power is continuously supplied from the battery 23 to the SSDs 30-2 and 30-3.

When a power loss is detected, the initiate request (I) is transmitted not only to the SSD 30-1 to which supply of power is to be stopped but also to the SSDs 30-2 and 30-3. The SSDs 30-2 and 30-3 to which the power is continuously supplied do not require the PLP process. Therefore, the cancellation request (C) for canceling the initiate request (I) is transmitted to the SSDs 30-2 and 30-3 but is not transmitted to the SSD 30-1.

The SSDs 30-2 and 30-3 which receives the cancellation request (C) determine that the initiate request (I) has been canceled, and do not execute the PLP process even when the cancelable period elapses and the initiate request (I) is at the high level.

Meanwhile, for the SSD 30-1 which does not receive the cancellation request (C), the initiate request (I) has the high level when the cancelable period elapses. Therefore, the SSD 30-1 executes the PLP process with the feedback signal (F) of the wiring 51 at the low level.

When the PLP process is completed, the SSD 30-1 releases the low level of the feedback signal (F) of the wiring 51.

The embedded controller 22 may monitor the feedback signal (F) to detect that the PLP process has been started in at least one of the SSDs 30-1, 30-2 and 30-3 and that the PLP process has been ended in all of the SSDs 30-1, 30-2 and 30-3.

Effect of Sixth Embodiment

According to the sixth embodiment, the cancellation of the initiate request (I) is performed by the cancellation request (C) separated from the initiate request (I). Therefore, when the plurality of SSDs 30-1, 30-2 and 30-3 are implemented and the initiate request (I) is issued in common to the SSDs 30-1, 30-2 and 30-3, it is possible to selectively designate an SSD that executes the PLP process and an SSD that does not execute the PLP process.

In addition, the feedback signals (F) of the SSDs 30-1, 30-2 and 30-3 are collected at the wiring 51 and are notified to the host 20 via the wiring 51. Thus, when the plurality of SSDs 30-1, 30-2 and 30-3 are used, it is possible to reduce the number of wirings between the host 20 and the SSDs 30-1, 30-2 and 30-3.

Seventh Embodiment

Figure 15:
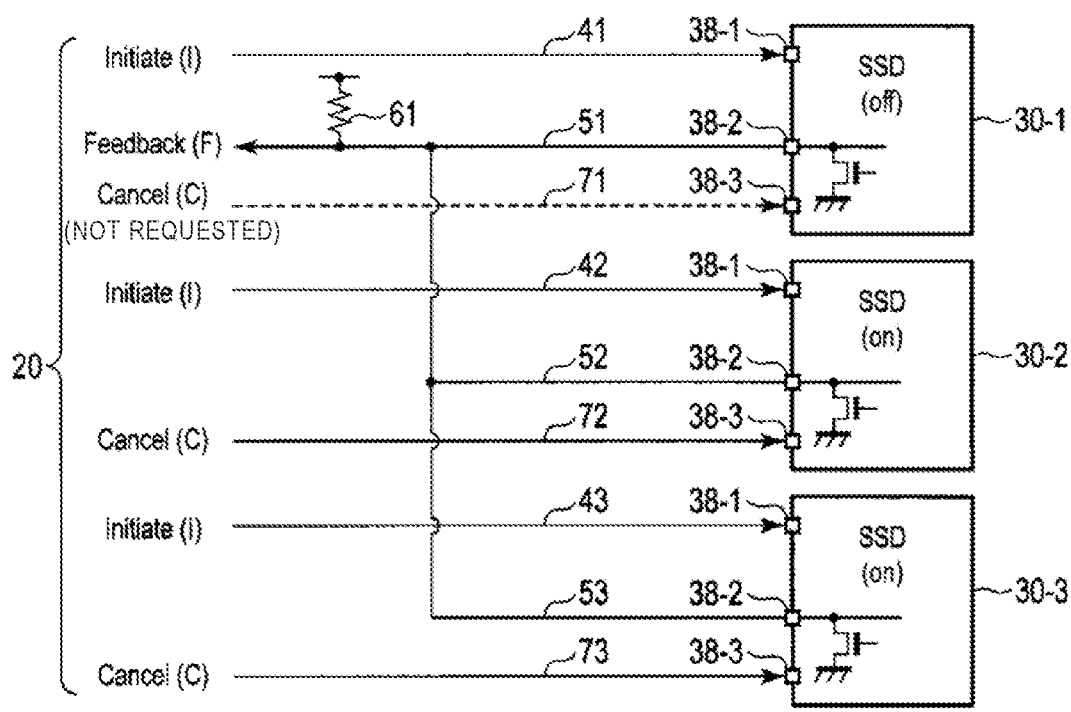
FIG. 15 is a view illustrating the configuration of a memory system according to a seventh embodiment, which is a modification of FIG. 14.

FIG. 15 illustrates the configuration of a seventh embodiment.

The seventh embodiment illustrates a modification of the sixth embodiment. In the sixth embodiment, the initiate request (I) issued from the embedded controller 22 is supplied to the wiring 41 and is transmitted to the SSDs 30-1, 30-2 and 30-3 via the wiring 41 and the wirings 42 and 43 connected to the wiring 41.

In contrast, in the seventh embodiment, the wirings 41, 42 and 43 are connected between the embedded controller 22 and the SSDs 30-1, 30-2 and 30-3, respectively. The initiate request (I) issued from the embedded controller 22 is transmitted to the SSDs 30-1, 30-2 and 30-3 via the wirings 41, 42 and 43, respectively. The other configurations are the same as in the sixth embodiment.

In the seventh embodiment, the cancellation request (C) is not necessary and may be omitted.

Effects of Seventh Embodiment

According to the seventh embodiment, the embedded controller 22 may selectively issue the initiate request (I) to the SSDs 30-1, 30-2 and 30-3 and may selectively issue the cancellation request (C) to the SSDs 30-1, 30-2 and 30-3. Therefore, when the plurality of SSDs 30-1, 30-2 and 30-3 are implemented, it is possible to selectively designate an SSD that executes the PLP process and an SSD that do not execute the PLP process.

Moreover, for example, at the time of power loss, when it is necessary to execute the PLP process for all of the SSDs 30-1, 30-2 and 30-3, the initiate request (I) may be selectively issued to the SSDs 30-1, 30-2 and 30-3. Therefore, it is also possible to select the SSDs 30-1, 30-2 and 30-3 to which the initiate request (I) is issued, according to the worst value of the PLP processing time of each of the SSDs 30-1, 30-2 and 30-3.

In addition, in consideration of the time required for the PLP process of each of the SSDs 30-1, 30-2 and 30-3, it is also possible to select the SSDs 30-1, 30-2 and 30-3 to which the initiate request (I) is issued. For example, when the remaining capacity of the battery 23 is small, it is possible to issue the initiate request (I) only to an SSD capable of executing the PLP process in a short time, and not request the PLP process for an SSD that requires a long time for the PLP process by not issuing the initiate request (I). The worst value of the PLP process illustrated in FIG. 4, which may be acquired by issuing the Identify command from host 20, may be sufficient for the time required for the PLP process.

Eighth Embodiment

Figure 16:
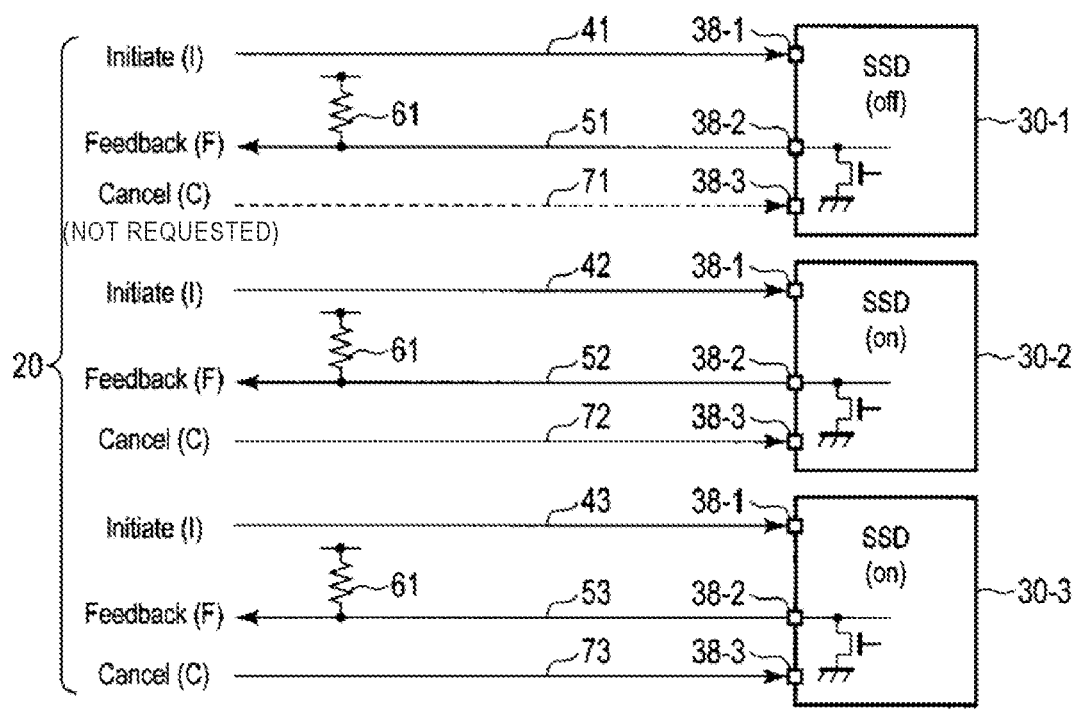
FIG. 16 is a view illustrating the configuration of a memory system according to an eight embodiment, which is a modification of FIG. 15.

FIG. 16 illustrates the configuration of an eighth embodiment.

The eighth embodiment illustrates a modification of the seventh embodiment. In the seventh embodiment, the feedback signals (F) output from the SSDs 30-1, 30-2 and 30-3 are transmitted by the wiring 51 to the embedded controller 22 through the wired OR circuit configured with the wirings 51, 52 and 53.

In contrast, in the eighth embodiment, the wirings 51, 52 and 53 are connected between the embedded controller 22 and the SSDs 30-1, 30-2 and 30-3, respectively. The feedback signals (F) output from the SSDs 30-1, 30-2 and 30-3 are transmitted to the embedded controller 22 via the wirings 51, 52 and 53, respectively. A pull-up resistor 61 is connected to each of the wirings 51, 52 and 53.

When the pin attribute is push-pull, the pull-up resistor 61 may be omitted and the other configurations are the same as in the seventh embodiment.

Effect of Eighth Embodiment

According to the eighth embodiment, the feedback signals (F) output from the SSDs 30-1, 30-2 and 30-3 may be transmitted to the embedded controller 22 via the wirings 51, 52 and 53, respectively. Therefore, when the plurality of SSDs 30-1, 30-2 and 30-3 are implemented, the embedded controller 22 may use the feedback signals (F) output from the SSDs 30-1, 30-2 and 30-3 to detect the execution status of the PLP process of the SSDs 30-1, 30-2 and 30-3, respectively. Accordingly, it is possible to shut down the power of the information processing apparatus 10 without fail.

Ninth Embodiment

Figure 17:
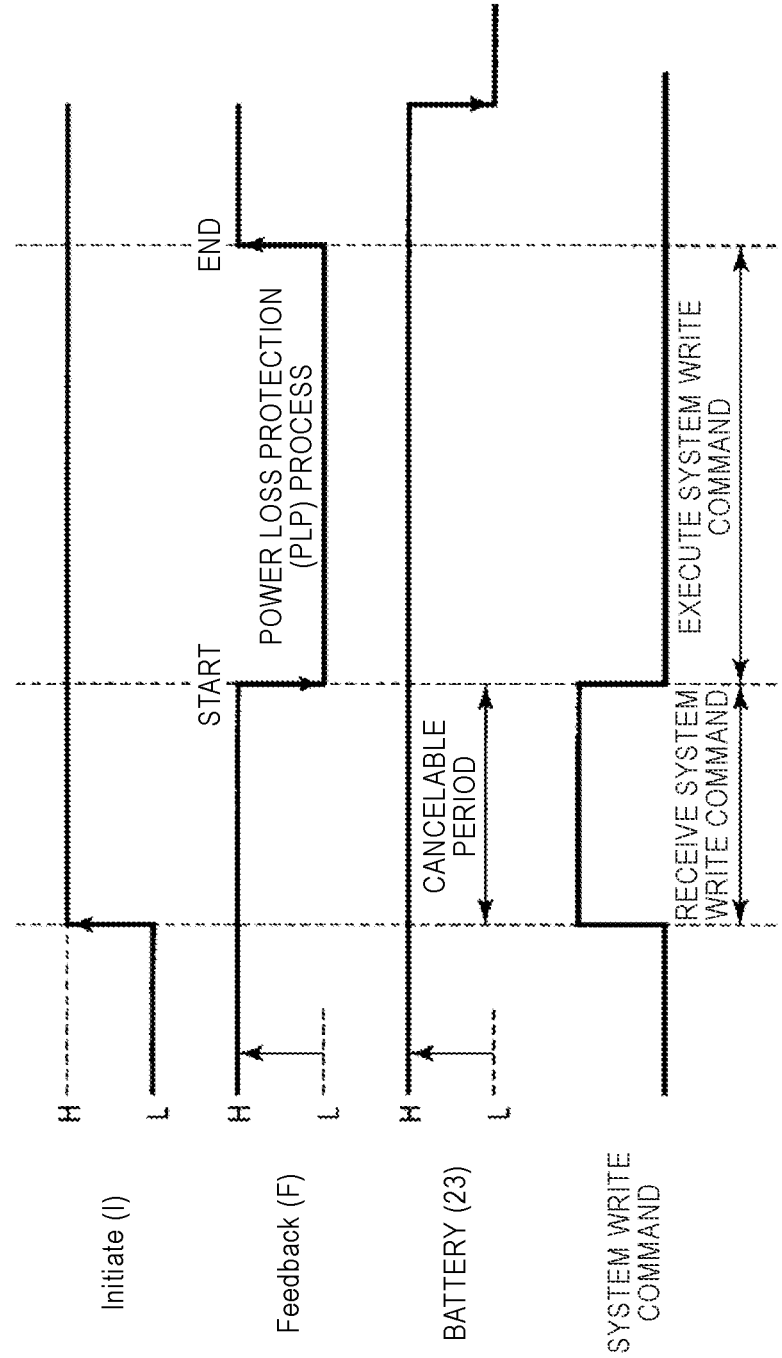
FIG. 17 is a timing chart illustrating the operation of a memory system according to a ninth embodiment.

FIG. 17 illustrates the operation of a ninth embodiment.

Typically, when the supply of power to the SSD 30 is stopped, it is necessary to rapidly non-volatilize data in the volatile memory of the SSD 30. Meanwhile, when the supply of power to the host 20 is stopped, it is also necessary to save data stored in the volatile memory of the host 20 in the SSD 30.

In the ninth embodiment illustrated in FIG. 17, in order to save the data stored in the volatile memory of the host 20 in the SSD 30, the host 20 issues within the cancelable period a write command (also referred to as a system write command) that requests the minimum data necessary for system maintenance to be written.

The system write command is, for example, the following writes.
  Boot Partition Write
  High-priority write with FUA (Force Unit Access)
  Write in a special area defined by BAR (Base Address Register) of PCIe Upon receiving the system write command from the host 20 within the cancelable period, the PLP controller 36 of the SSD 30 executes the system write command during the PLP process. When the PLP process including the system write command is completed, the completion of the PLP process is notified to the host with the feedback signal (F) at the high level.

Effects of Ninth Embodiment

According to the ninth embodiment, when the system write command is issued from the host 20 within the cancelable period after the initiate request (I) is issued from the embedded controller 22, the PLP controller 36 of the SSD 30 processes data related to the system write command in the PLP process. Therefore, when the supply of power to the host 20 is stopped, the data in the volatile memory of the host 20 may be saved in the SSD 30. Accordingly, it is possible to improve the reliability of the information processing apparatus 10.

Tenth Embodiment

Figure 18:
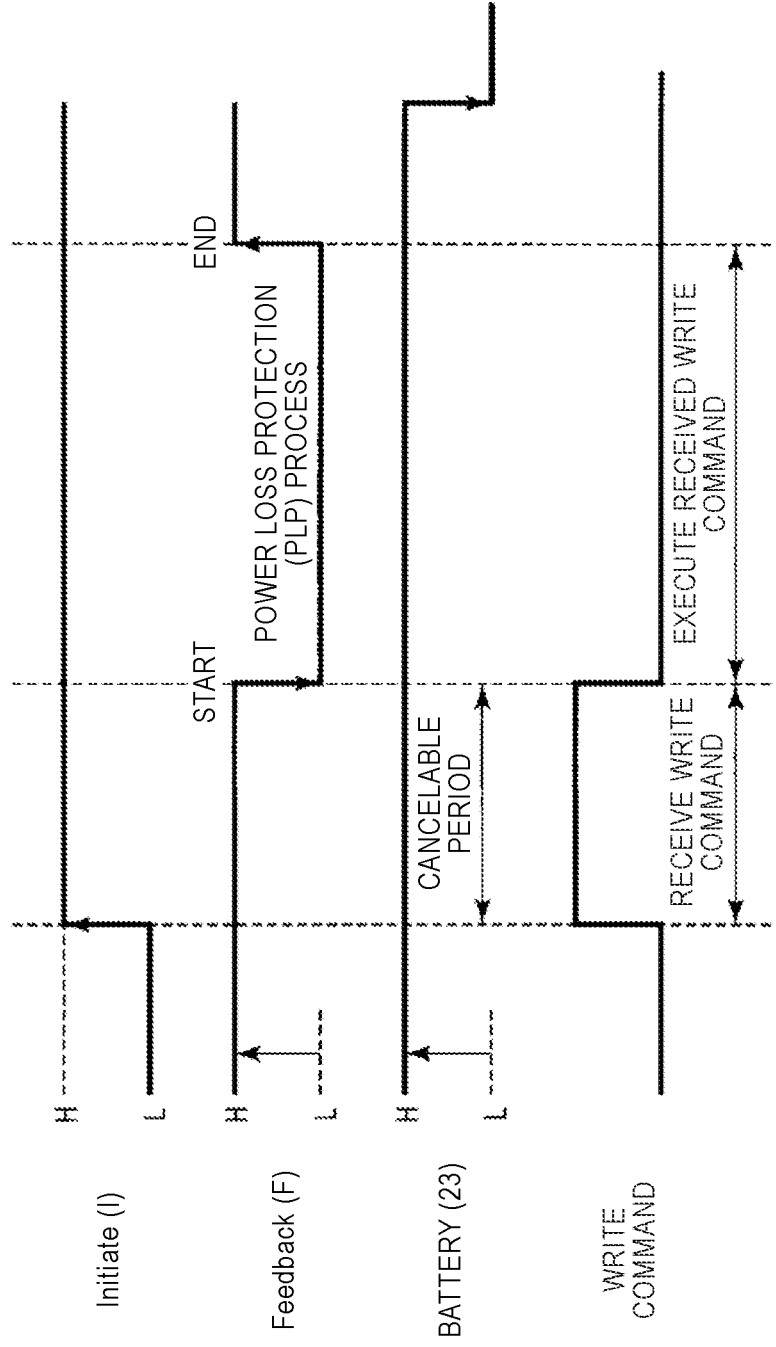
FIG. 18 is a timing chart illustrating the operation of a memory system according to a tenth embodiment.

FIG. 18 illustrates the operation of a tenth embodiment.

Upon receiving the write command for write of user data or the system write command and receiving all the data in the write buffer 33c, the SSD 30 transmits a completion notification indicating the completion of write to the host 20. However, at this point of time, the data write into the NAND flash memory 35 has not actually been completed. Thus, when the supply of power to the SSD 30 is stopped before the data write into the NAND flash memory 35 has actually completed, inconsistency of data occurs. Accordingly, the write command for which the completion notification is notified to the host 20 is regarded as the object of non-volatilization process, and the data write into the NAND flash memory 35 should be completed by the PLP process.

Meanwhile, the write command that has been received by the SSD 30 but for which the SSD 30 does not notify the host 20 of its completion is not regarded as an object of the non-volatilization process.

In the tenth embodiment, after the initiate request (I) is issued from the embedded controller 22, the write command issued from the host 20 within the cancelable period is included in the object of the PLP process irrespective of whether or not the completion notification is transmitted.

As illustrated in FIG. 18, upon receiving the write command issued from the host 20 within the cancelable period after the initiate request (I) is issued from the embedded controller 22, the SSD 30 includes the write command as the object of the PLP process, executes the PLP process, and transmits the completion notification. When the PLP process including the write command is completed, the completion of the PLP process is notified to the host 20 with the feedback signal (F) at the high level.

Effects of Tenth Embodiment

According to the tenth embodiment, the write command issued from the host 20 within the cancelable period after the initiate request (I) is issued from the embedded controller 22 is included as an object of the PLP process irrespective of whether or not the completion notification is transmitted. Therefore, when the supply of power to the SSD 30 is stopped, data which were not intended for non-volatilization before the initiate request (I) is issued may be saved into the NAND flash memory 35. Accordingly, it is possible to improve the reliability of the information processing apparatus 10.

The first to tenth embodiments have been described by way of example of a note book computer or a tablet computer. However, the present disclosure is not limited thereto but may be applied to other electronic apparatuses equipped with a recording device such as SSD or HDD.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a volatile memory;
a nonvolatile memory; and
a controller configured to execute a non-volatilization process to store data in the volatile memory into the nonvolatile memory in response to an initiate request received by the controller if no cancellation request is received by the controller during a cancelable period that begins upon receipt of the initiate request by the controller, and to transmit a completion notification when the non-volatilization process has completed, wherein the controller is configured to not execute the non-volatilization process if the cancellation request is received during the cancelable period, and the cancelable period is configurable based on a set feature command received by the controller, the set feature command including information output by a host for setting a feature of the memory system.

2. The memory system according to claim 1, wherein the non-volatilization process executed by the controller includes execution of a system write command received during the cancelable period.

3. The memory system according to claim 2, wherein the system write command includes at least one of boot partition write, high-priority write with a force unit access (FUA) in which data is written directly into the nonvolatile memory, and write in a special area defined by a base address register (BAR) of PCIe.

4. The memory system according to claim 1, wherein the cancelable period is configurable to a value specified in the set feature command and a range of possible values for the cancelable period set by the controller.

5. The memory system according to claim 4, wherein the non-volatilization process executed by the controller includes execution of a system write command received during the cancelable period.

6. The memory system according to claim 5, wherein the system write command includes at least one of boot partition write, high-priority write with a force unit access (FUA) in which data is written directly into the nonvolatile memory, and write in a special area defined by a base address register (BAR) of PCIe.

7. The memory system according to claim 4, wherein the initiate request is made through a signal transmitted to the controller where the signal is at a first voltage level, and the cancellation request is made by changing the voltage level of the signal from the first voltage level to a second voltage level, the second voltage level being different from the first voltage level.

8. The memory system according to claim 7, wherein if the controller receives the cancellation request during the cancelable period and another initiate request is made during the cancelable period, the controller resets a measurement of the cancelable period.

9. The memory system according to claim 4, wherein the controller is configured to execute the non-volatilization processing in either a first power loss protection (PLP) mode or a second PLP mode, and the non-volatilization processing time is longer in the first PLP mode than in the second PLP mode.

10. The memory system according to claim 1, wherein the initiate request is made through a signal transmitted to the controller where the signal is at a first voltage level, and the cancellation request is made by changing the voltage level of the signal from the first voltage level to a second voltage level, the second voltage level being different from the first voltage level.

11. The memory system according to claim 10, wherein if the controller receives the cancellation request during the cancelable period and another initiate request is made during the cancelable period, the controller resets a measurement of the cancelable period.

12. The memory system according to claim 1, wherein the controller is configured to execute the non-volatilization processing in either a first power loss protection (PLP) mode or a second PLP mode, and the non-volatilization processing time is longer in the first PLP mode than in the second PLP mode.

13. A memory system comprising:
a volatile memory;
a nonvolatile memory; and
a controller configured to execute a non-volatilization process to store data in the volatile memory into the nonvolatile memory in response to an initiate request received by the controller if no cancellation request is received by the controller during a cancelable period that begins upon receipt of the initiate request by the controller, and to transmit a completion notification when the non-volatilization process has completed,
wherein the controller is configured to not execute the non-volatilization process if the cancellation request is received during the cancelable period, and
wherein
the initiate request is made through a signal transmitted to the controller where the signal is at a first voltage level, and the cancellation request is made by changing the voltage level of the signal from the first voltage level to a second voltage level, the second voltage level being different from the first voltage level, and
if the controller receives the cancellation request during the cancelable period and another initiate request is made during the cancelable period, the controller resets a measurement of the cancelable period.

14. The memory system according to claim 13, wherein the non-volatilization process executed by the controller includes execution of a system write command received during the cancelable period.

15. The memory system according to claim 14, wherein the system write command includes at least one of boot partition write, high-priority write with a force unit access (FUA) in which data is written directly into the nonvolatile memory, and write in a special area defined by a base address register (BAR) of PCIe.

16. The memory system according to claim 13, wherein the controller is configured to execute the non-volatilization processing in either a first power loss protection (PLP) mode or a second PLP mode, and the non-volatilization processing time is longer in the first PLP mode than in the second PLP mode.

17. A memory system connectable to a host having a first controller, comprising:
a second controller configured to be connected to the first controller through a plurality of pins including a first pin through which an initiate request is received and a second pin through which a feedback signal is transmitted; and
a nonvolatile memory, wherein
the second controller is configured to write data stored in volatile memory into the nonvolatile memory, in response to the initiate request received through the first pin if no cancellation request is received by the second controller during a cancelable period that begins upon receipt of the initiate request, and to transmit a completion notification through the second pin upon completion of a non-volatilization process that includes writing of the data stored in the volatile memory into the nonvolatile memory,
wherein
the second controller is configured to not execute the non-volatilization process if the cancellation request is received during the cancelable period, and
the cancelable period is set by the second controller based on a set feature command transmitted from the first controller to the second controller, the set feature command including information output by the host for setting a feature of the memory system.

18. The memory system according to claim 17, wherein the cancellation request is received through the first pin by changing a voltage level of the signal that contains the initiate request.

19. The memory system according to claim 17, wherein the plurality of pins include a third pin through which the cancellation request is to be received from the first controller.

20. The memory system according to claim 17, wherein the second controller is configurable according to a set feature command from the first controller to execute the non-volatilization processing in either a first power loss protection (PLP) mode or a second PLP mode, and the non-volatilization processing time is longer in the first PLP mode than in the second PLP mode.

* * * * *